United States Patent [19]

Born et al.

[11] Patent Number: 4,923,540

[45] Date of Patent: May 8, 1990

[54] METHOD AND JOINING PROFILES

[76] Inventors: Eberhard Born; Helmut Korber; Josef Mersch, all of Bayer Aktiengesellschaft, D 5090 Leverkusen, Bayerwerk, Fed. Rep. of Germany

[21] Appl. No.: 310,473

[22] Filed: Feb. 13, 1989

Related U.S. Application Data

[63] Continuation of Ser. No. 834,407, Feb. 28, 1986, abandoned.

[30] Foreign Application Priority Data

Mar. 3, 1985 [DE] Fed. Rep. of Germany ....... 3508644

[51] Int. Cl.⁵ .................... B32B 31/00; B29C 65/00
[52] U.S. Cl. .................................. 156/86; 156/153; 156/158; 156/159; 156/294; 156/304.2; 156/304.3; 156/304.5
[58] Field of Search .............. 156/304.2, 304.3, 304.5, 156/158, 159, 153, 294, 85, 86

[56] References Cited

U.S. PATENT DOCUMENTS 3,885,071  5/1975  Blad .................................. 156/304.5
4,220,619  9/1980  Kersten ............................ 156/304.3
4,256,412  3/1981  Tybus ................................ 156/158

Primary Examiner—George F. Lesmes
Assistant Examiner—J. Davis

[57] ABSTRACT

The invention relates to a method of joining two bevelled rod ends composed of plastics material reinforced with long fibres, using a shrinkable tube.

2 Claims, 1 Drawing Sheet

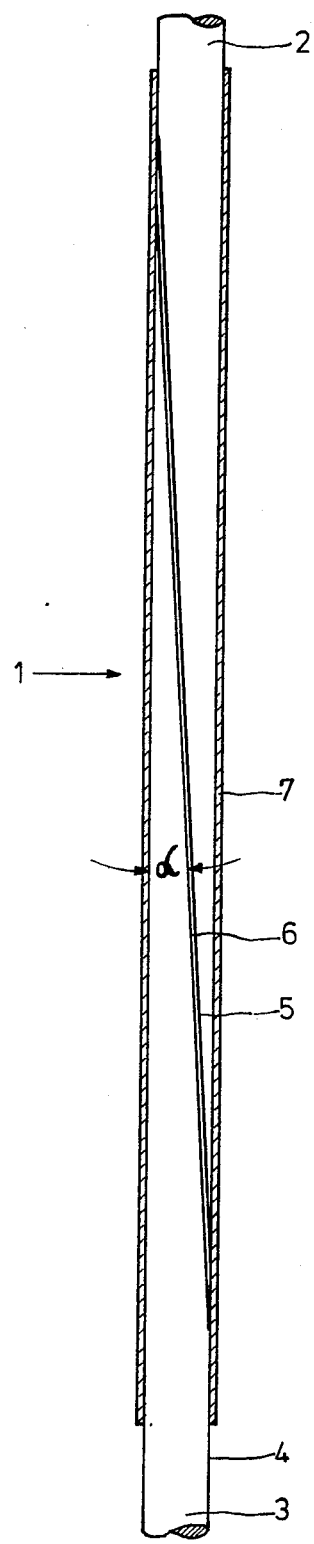

METHOD AND JOINING PROFILES

This application is a continuation of application Ser. No. 834,407, filed Feb. 28, 1986 now abandoned.

This invention relates to a method and joining profiles, in particular of round cross section, composed of plastics materials reinforced with long fibres by sticking the ends together with resins.

Joins between profiles composed of glass fibre reinforced plastics materials (GFP) are known in which hot-setting resins of the plastics matrix which are not yet cured are joined wet-in-wet with hot-curable adhesives at the adhesion point.

The disadvantage of this method lies in the fact that it can only be carried out during actual production of the profiles in the factory. Continuous profiles cannot be produced thereby owing to the problems of transportation to the location of use.

It is also known that GFP laminates can be joined by the toothed overlapping of the glass mat or fabric inlays.

This method is very complicated, particularly in the case of small profiles and/or unsuitable (for example round) shapes. Moreover, the strength decreases greatly if the original cross-section is not maintained.

An object of the invention, for the production of continuous plastics profiles from limited lengths, reinforced by long, in particular unidirectional, fibres, is to find a join which has a strength approximately equal to the unweakened profiles while maintaining the cross-section and which is simple to produce on site.

The object is achieved according to the invention in that the respective ends of the profiles are provided with faces at an angle of from 0.1° to 3°, in particular from 0.2° to 0.5° to the longitudinal axis by removing material, the faces then being stuck in true alignment with one another under pressure.

It is surprising for a person skilled in the art that even profiles containing a relatively large proportion of undirectional fibres can be joined without significant losses in tensile and bending strength while maintaining a constant cross-section, contrary to popular opinion which formerly assumed that a reliable transmission of forces was possible only with transverse pressure. Even small round cross-sections having a radius of up to 1.5 mm, of the type frequently found when using Polystal ®, a plastics material containing unidirectional fibres, can be joined securely therewith.

In a particular embodiment of the method, at least a few fibres are freed from the surrounding embedding resin over a length of from 1 to 30 mm, in particular from 2 to 12 mm when removing material by grinding.

The plastics matrix between the long fibres, particularly in the case of unidirectionally orientated continuous fibres can be removed by an revolving grinding belt which is slightly inclined to the longitudinal direction. The remaining fibres projecting from bevelled faces of the round plastics profile in a proportion of at least 30%, preferably 50% of the original inlays, produce a secure join at the adhesion point.

In a further embodiment of the method, the adhesion is produced by cold-setting resins while supplying heat.

Curing on site is accelerated by supplying heat, cold-setting epoxide resins (such as Araldite ® AW 134 with HY 994, Lekutherm ® 571 or 20 with T3) and cold setting polyurethane resins (such as Baygal K55 and Baymidur K88) having proven particularly suitable.

In a further embodiment of the method, a tube is pulled over the combined ends and is then shrunk by supplying heat, in order to orientate the profiles.

It is very easy to pull over a thin tube of shrinkable material. Owing to the heat required for the setting process, the tube shrinks and automatically orientates the ends. The shrunk tube simultaneously produces the necessary pressure for pressing excess resin from the join and then fixes the two ends securely in the adhesion position until the resin has cured. The same effect can also be achieved by winding a thin heat-shrinking polyester or polyamide filament or strip round the adhesion point.

On completion of the procedure, the tube can easily be removed or can remain as protection even if the profiles are covered with a protective sheath.

Use of the shrinkable tube is illustrated in the drawing. In the drawing, round profiles 2 and 3 to be joined have been bevelled at an angle (alpha) between 0.1° to 3° to the longitudinal axis, such that the profile surface 4 of the profiles tapers to a bevelled face 5. Adhesive resin may be applied to the space 6 defined between the bevelled surfaces. Shrinkable tube 7 is positioned over the joint to hold the profiles in position to be joined.

With the non-positive joining of plastics rods by the above-mentioned method, the ends of the profiles which are bevelled at an angle of from 0.1° to 3° to the longitudinal axis are each combined in alignment with their ends running out to zero thickness in opposing directions in such a way that the original cross-section is approximately maintained.

With this design it is possible to join, for example, high strength flexible round plastics rods containing inlays composed of many continuous glass fibres in at least one outer glass fibrewinding which are known under the name Polystal ®, without at increase in cross-section. Long carbon or aramide fibres can obviously also be used.

In a preferred embodiment, fibres project from a face, which is designed for adhesion, in a length greater than 1 mm.

The adhesion is improved by projecting fibres, in particular originally unidirectional long glass fibres, so that losses of strength are rarely present in the region of the join.

In one embodiment, additional reinforcements are arranged between the joined faces.

The strength can be desirably influenced using reinforcements of greater strength than the long fibres as the possible weakening can be compensated again by them.

The two ends of a rod of Polystal ® to be joined are removed from the drum and each stuck on stop moulds which are then arranged on both longitudinal sides of an encircling grinding belt having a granulation of between 80 and 120 on carriages in such a way that the longitudinal axis of the rods forms an angle of 0.33° to the direction of travel.

The two ends are ground simultaneously by moving the carriages so that the grinding belt runs in the direction of decreasing thickness of the rods. The ends are then removed from the stop mould and freed from dust using acetone. One tube and three tube straps of shrinkable film on whose interior a polytetrafluoroethylene is sprayed, are pushed onto the rod. After applying cold setting epoxide resins using a brush, the two ends are placed congruently on one another and positioned with the pushed on straps which are subsequently shrunk by heat. The tube is then pushed over the join and is shrunk so that excess resin can escape in one direction prior to shrinkage. On completion of this process, the ends are centred and pressed together since the original diameter of the tube shrinks to half at a temperature of between 120° and 200°. After the accelerated curing of the epoxide resin by supply of heat, the tube and the tube straps are removed.

The procedure described above was carried out in the same manner for the following profiles

|      |   |         | Splicing angle | Splicing length |
|------|---|---------|----------------|-----------------|
| V 24 | ⌀ | 1.35 mm | 0.33           | 236 mm          |
| V 30 | ⌀ | 1.51 mm | 0.33           | 264 mm          |
| V 36 | ⌀ | 1.65 mm | 0.33           | 288 mm          |
| V 48 | ⌀ | 1.91 mm | 0.33           | 350 mm          |

Tensile strengths of between 85% and 95% of that of the original rods were determined during tensile testing of the spliced samples.

This joining method is particularly important in the cable industry. GFP profiles are used as supporting and tension relieving elements in light guide cables there. Relatively long cables can be produced only if a joining method which as far as possible can also be carried out directly on the cable machine and does not lead to thickened regions is available for GFP profiles.

The joining of identical rods which have been made by conventional staggered notched overlap ttained only 30% of the tensile strengths of the original rods.

We claim:

1. An improved method for joining round profiles composed of long-fiber-reinforced plastics materials by adhering the ends together using resins while maintaining the cross section of the profile, comprising providing the profiles to be adhered with faces at an angle of from 0.1° to 0.5° to the longitudinal axis by removing material from the faces whereby at least a few fibers are freed from the surrounding embedding resin over a length of from 1 to 30 mm, orienting the profiles, positioning a removeable tube over the combined profile ends, and adhering the faces in true alignment under pressure.

2. A method according to claim 1, characterised in that the adhesion is effected by cold-setting resins while supplying heat.

* * * * *